Sept. 16, 1969   G. D. ANDREEVSKAYA ET AL   3,467,507
APPARATUS FOR PRODUCING NONWOVEN FIBER MATERIAL
Filed May 12, 1966                                    5 Sheets-Sheet 4

United States Patent Office 3,467,507
Patented Sept. 16, 1969

3,467,507
APPARATUS FOR PRODUCING NONWOVEN FIBER MATERIAL
Galya Dmitrievna Andreevskaya, Novye Cheremushki, kvartal 21-a, korp. 2, kv. 15, and Alexandr Dmitrievich Bernatsky, Verkhnyaya maslovska, 79, korp. 2, kv. 36, both of Moscow, U.S.S.R.; Abram Elkunovich Gudelman, bulvar Perova, 11/3, kv. 83, Zelman Moiseevich Volovich, ul. Chubarya, 16/50, kv. 85, and Alexandr Tosifovich Zektser, Iskrovskaya, 3, kv. 13, all of Kiev, U.S.S.R.; Eduard Semenovich Zelensky, Baltiiskaya ul., 6, korp. 2, kv. 156, Moscow, U.S.S.R.; Kuzma Nikitich Kiselev, Svechnoi proezd, 27, kv. 59, and Nikolai Fedorovich Kozlov, prospekt Engelsa, 22, kv. 70, both of Leningrad, U.S.S.R.; Vladimir Alexandrovich Kulakovsky, Krasnitskogo ul., 25, and Semen Moiseevich Polischuk, Engelsa, 17, kv. 19, both of Kiev, U.S.S.R.; Vasily Petrovich Sveshnikov, ul. Blagodatnaya, 57, kv. 22, Leningrad, U.S.S.R., and Vladimir Mikhailovich Sheinblujm, ul. Gogolevskaya, 49, kv. 8, Kiev, U.S.S.R.
Filed May 12, 1966, Ser. No. 549,687
Int. Cl. C03c 27/00
U.S. Cl. 65—11           5 Claims

ABSTRACT OF THE DISCLOSURE

A device is provided for the production of nonwoven fiber material, such as glass fiber wherein the produced fibers with a bonding agent applied thereto are formed into a tube by means of a winding head which cooperates with a delivery means, the winding head being rotatable and oscillatable to provide a sloping cross winding of the fiber material of the tube on the delivery means. A cutter is mounted under the delivery means for slitting the fiber material as it is removed from the delivery means to produce a band or web of such material.

---

This invention relates to the manufacture of reinforced plastic material, and more particularly, to apparatus for producing non-woven material with directionally oriented fibers (unidirectional nonwoven material).

The prior art devices used in the manufacture of reinforced plastic for producing nonwoven material with directionally oriented fibers include those comprising: jet-nozzle (spinneret) furnaces for fiber manufacture, a collecting roller, a winding head, a delivery arrangement designed as a cylindrical block of elastic conveyors and a cutter.

However, these devices are not suitable for manufacturing nonwoven material with oriented fibers in the form of a continuous web or band, and do not ensure the possibility of preserving the unidirectional structure of the material at the uninterrupted doffing of the nonwoven material from the unit.

Attempts to eliminate the above-mentioned disadvantages have heretofore proven unsuccessful.

The object of the present invention is to provide a device for the mechanized manufacture of nonwoven material in the form of a continuous web or band with directionally oriented fibers retaining this kind of structure at continuous doffing from the unit.

Now it is established, that this object may be achieved by means of a device for producing nonwoven material comprising a jet-nozzle furnace for producing fibers, an arrangement under said furnace for applying a bonding agent and forming said fibers into yarn, a winding head with a spreader rotating on a vertical shaft; a delivery means consisting of conveyors arranged around and parallel to the axis of the vertical shaft, said conveyors being located under the arrangement for applying the bonding agent, a device for imparting oscillation to the spreader in the vertical plane, said device being mounted in the upper part of the delivery means and ensuring a sloping cross winding onto the delivery arrangement for reinforcing the nonwoven material in the direction perpendicular to fiber orientation, a drying-and-heating chamber arranged around the delivery arrangement; a device for separating the nonwoven material from the conveyors and for preserving the unidirectional structure of the nonwoven material at continuous doffing from the delivery arrangement, said separating device being housed in the bottom part of the delivery arrangement; a cutter for slitting the nonwoven material into a band or web located under the delivery arrangement; and conveyors for forwarding the nonwoven material to the point of storage or processing, arranged in the bottom part of the device for the manufacture of the nonwoven material.

When using slow-drying binders for additionally reinforcing the nonwoven material in the direction perpendicular to fiber orientation, around the top part of the delivery motion an arrangement is provided for stitching the nonwoven material with synthetic yarn during its transport by the conveyors.

The arrangement for imparting vertical oscillation to the spreader in the embodiment described herein, is a single-face end cam swinging on the vertical shaft of the unit and interacting with the spreader; the profile and rotational speed of the cam ensures cross winding at a preset angle.

The arrangement for separating the nonwoven material from the conveyors should be preferably constituted as radially moving pushers, actuated by a cylindrical cam rotating on the vertical shaft of the unit.

For a better understanding of the invention the following description is given hereinbelow with reference to the accompanying drawings, wherein.

Figure 1:
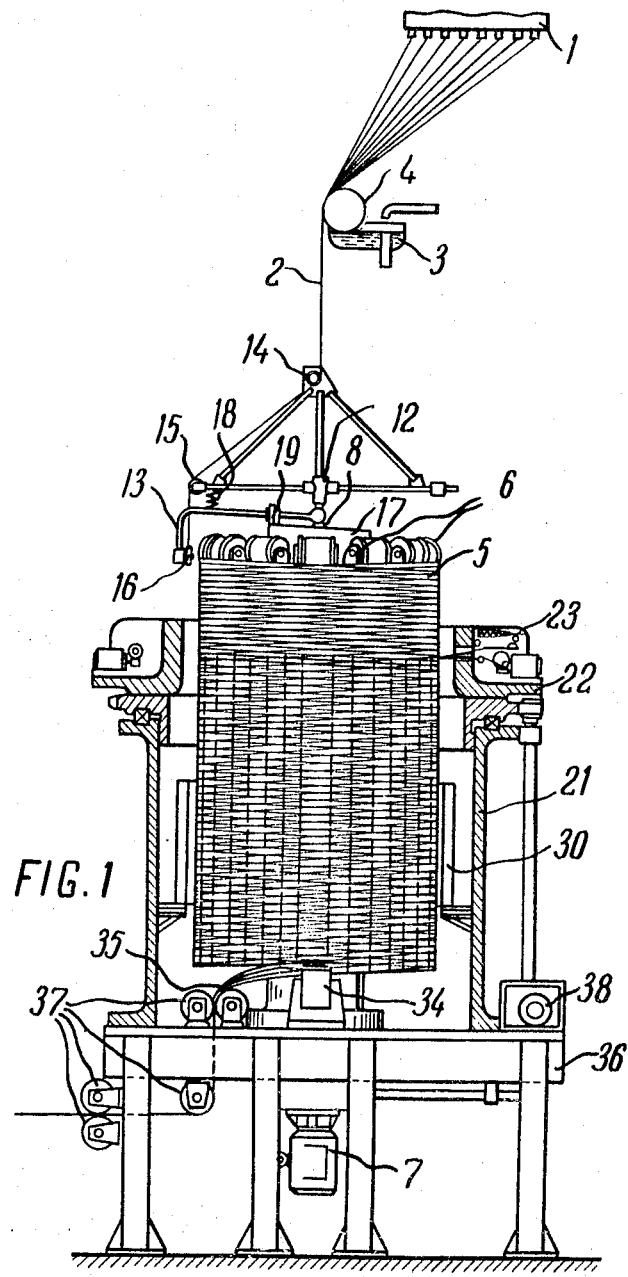
FIG. 1 is a side view of the unit for manufacturing nonwoven material in the form of a continuous band with fiber orientation in the direction of the band axis.

The device for manufacturing nonwoven material, and particularly for producing materials of glass fibers, comprises a jet-nozzle furnace 1 for manufacturing fibers with an arrangement 2 therebeneath for applying a bonding agent to the fibers and for forming the fibers into yarn, said arrangement consisting of a tank 3 with the bonding agent and a roller 4 (FIG. 1).

Figure 3:
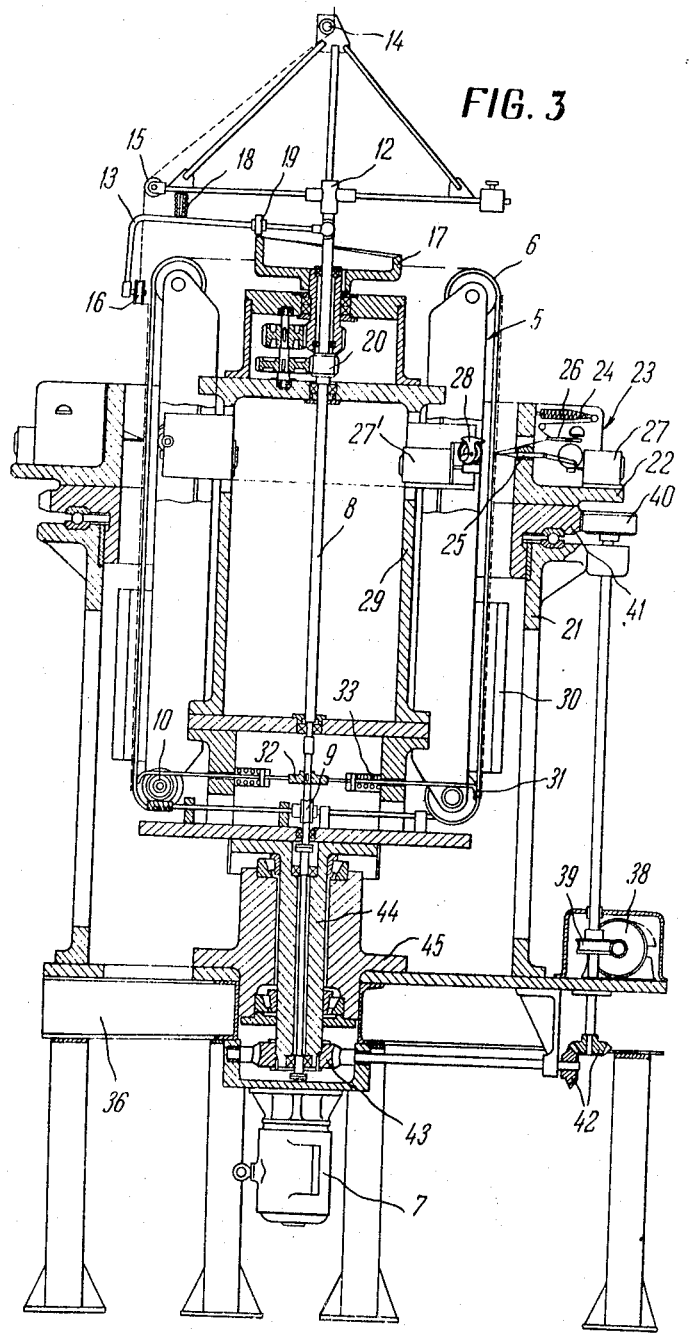
FIG. 3 is a longitudinal section of the unit for manufacturing nonwoven material (the jet-nozzle furnace and arrangement for applying the bonding agent to the fibers and for forming the fibers into yarn not being shown)
Figure 4:
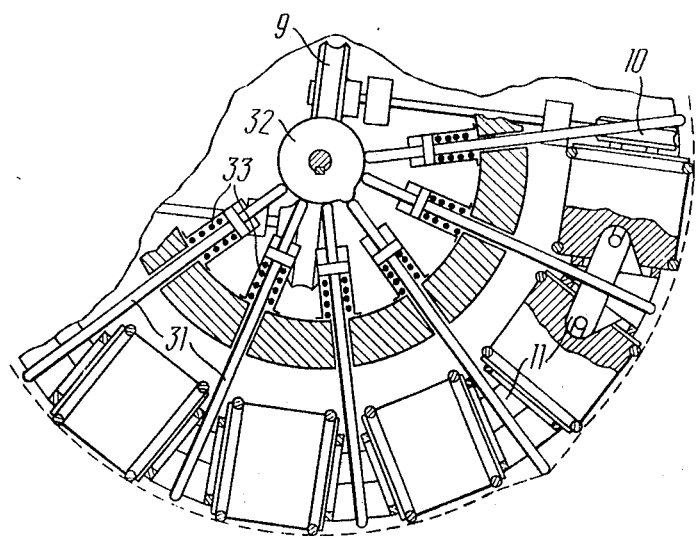
FIG. 4 is a partial section and a horizontal cutaway of an arrangement for separating nonwoven material from the conveyors.

Beneath arrangement 2 are located the following mechanisms: a delivery means 5 consisting of conveyors moving in synchronism and actuated by a motor 7, said conveyors being arranged around a vertical shaft 8 and parallel to its center line, a reducer 9, screw pairs 10 (FIG. 3) and links 11 (FIG. 4). The conveyors can be designed as stud chains with a flexible insulating covering.

In the upper part of the delivery means on the vertical shaft of the unit there is mounted a winding head 12 (FIGS. 1, 2 and 3) with a yarn spreader 13, a cantilevered centering roller 14 and guide rollers 15 and 16.

On the vertical shaft 8 of the unit, under the winding head 12, is an arrangement for imparting vertical oscillations to the yarn spreader 13 which in this particular embodiment is a single face cam 17 on which a spreader support roller 19 is pressed by a spring 18. Cam 17 is rotated through a reducer 20 (FIG. 3) from the vertical shaft 8 of the unit. The reducer ratio determines the relation between the speed of rotation of spreader 13 and the frequency of its oscillations.

The nonwoven material can be further reinforced by stitching with a synthetic yarn in the direction perpendicular to the fiber orientation. For this purpose around the upper part of the delivery means, a cylindrical support 21 is provided carrying a platform 22 bearing arrangements 23 for stitching the nonwoven material with the synthetic yarn. These arrangements comprise bobbins 24, needle clamps 25, thread takeup mechanism 26 and electric motors 27. Loopers 28 with electric motors $27^I$ connected to electric motors 27 by selsyns are mounted on a support 29 inside the delivery means (FIG. 3).

Figure 2:
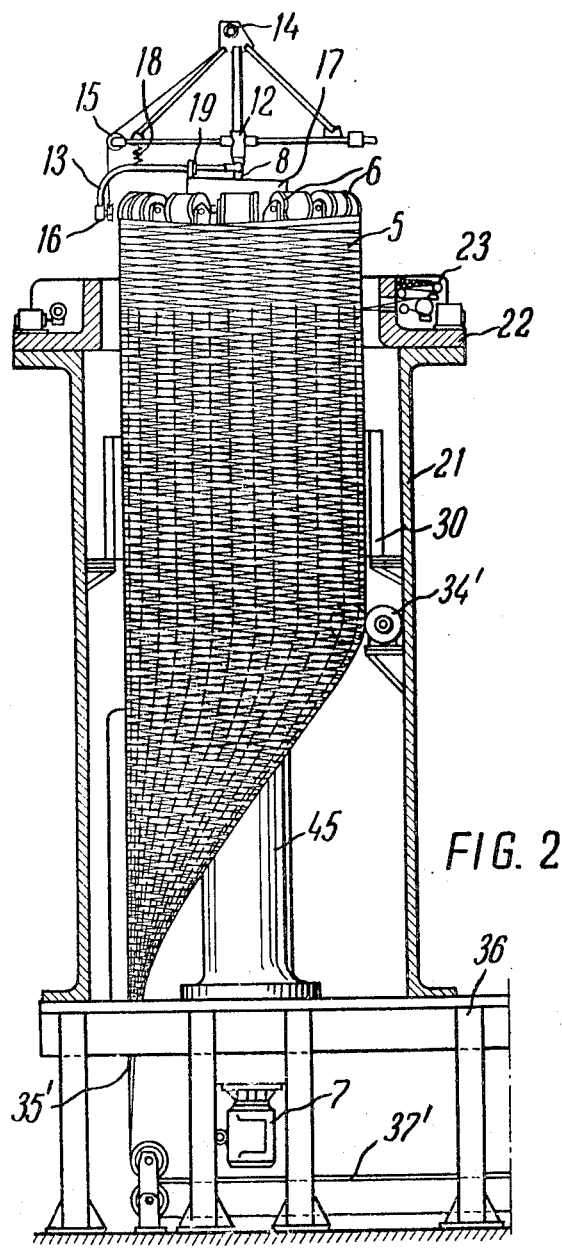
FIG. 2 is a side view of the unit for manufacturing nonwoven material in the form of a continuous web with fiber orientation perpendicular to the web axis, without the jet-nozzle fiber manufacturing furnace and without the arrangement for applying the bonding agent to the fibers and forming the fibers into yarn.

Around the receiver on the support 21 there is installed a drying-and-heating chamber 30 (FIGS. 1, 2 and 3). Drying of the nonwoven material in the chamber 30 can be effected by hot air or by electrical heating elements which are made movable to ensure a more uniform heating.

In the bottom part of the delivery means there is located an arrangement for separating nonwoven material from conveyors. In the present design this arrangement is composed of radially moving pushers 31 (FIGS. 3 and 4) actuated by a cylindrical cam 32 rotating on the vertical shaft of the unit. The pushers are pressed against the cam by springs 33.

The nonwoven material can be produced both as a web or a band.

Figure 5A:
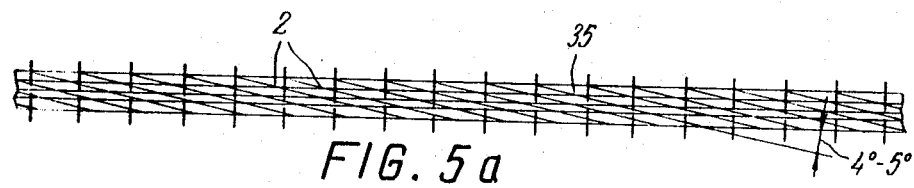
FIG. 5a shows the structure of the nonwoven material produced in the form of a band.
Figure 5B:
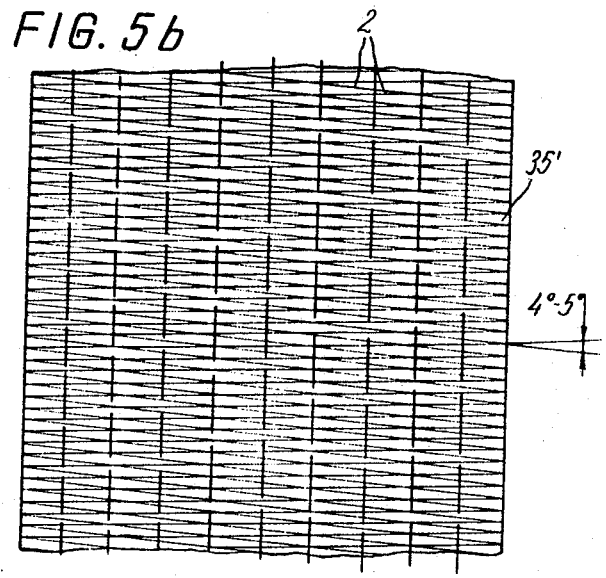
FIG. 5b shows the structure of the nonwoven material produced in the form of a web.

For slitting the material into the bands directly under the delivery means a cutter 34 is mounted which cuts the material along a spiral path into a band 35 (FIGS. 1 and 5).

Nonwoven materials are cut into webs by means of a cutter $34^I$ installed directly under the delivery means. Cutting of nonwovens into web $35^I$ (FIGS. 2 and 5) is effected vertically along the generatrix of the delivery motion.

For the transport of the band or web of nonwoven material to the point of storage or processing, there are mounted upon a frame 36 rollers 37 (FIG. 1) or conveyor $37^I$ (FIG. 2).

Rotation of the delivery means in synchronism with the platform 22 with the sitching arrangements is necessary when nonwoven materials are produced in the form of a band. For this purpose, an electric motor 38 (FIG. 3) actuates the platform 22 through the reducer 39 and spur gears 40 and 41. Bevel gears 42 and a reducer 43 are used for imparting rotation to cylindrical support 44 of the delivery means from the same motor.

When manufacturing nonwoven material in web form there is no need to rotate the delivery means and, hence, the platform 22. The delivery means is mounted directly on a stationary support 45 and the platform 22 is mounted on the stationary support 21 (FIG. 2).

The unit operates in the following manner.

A preset amount of bonding agent is applied onto the fibers extruded from the jet-nozzle furnace 1 by means of the roller 4, then the fibers formed into the yarn 2 passes by cantilevered centering roller 14 rotating together with winding head 12, then upon the guide rollers 15 and 16 and with the help of the spreader 13 is wound onto the upper part of the delivery means 5.

Upon the rotation of the winding head, the spreader performs simultaneously a rotational movement and a vertical oscillation; the oscillation is imparted to the spreader by single face cam 17 against which the spreader bearing roller 19 is pressed by a spring 18. The gear ratio of the reducer 20 determines the relation of the cam rotational speed to the speed of the spreader and is chosen so that when a cam of a preset profile is used, the angle of the cross winding on the delivery means must not exceed 4° or 5°, since such cross winding, when quick drying bonding agents are used, is sufficient to reinforce the nonwoven material in the direction perpendicular to the orientation of the fibers.

At the same time, this insignificant deviation from the parallel disposition of the fibers has no adverse effect upon the strength of articles made of unidirectional nonwoven materials.

The yarn wound by means of conveyors 6 moving in synchronism is continuously shifted downwards along the delivery motion thus forming a continuous "tube" of the nonwoven material. The synchronous movement of the conveyors is ensured by a common drive from the electric motor 7 through the vertical spindle 8 of the unit, the reducer 9, the screw pairs 10 and the links 11.

The use of slowly drying bonding agents may necessitate additional reinforcement of the nonwoven material in the direction perpendicular to the orientation of the fibers. For this purpose, during its movement downwards, the "tube" is stitched with a chain single-thread stitch by means of synthetic yarn at several points along the perimeter of the delivery means by the arrangements 23. Selsyns connecting electric motors 27 and $27^I$ also provide for the synchronous movement of needle clamps 25 and loopers 28.

Upon its further movement downwards, the nonwoven material is dried in the drying-and-heating chamber 30 to eliminate the solvent from the binder (if any is present) and also to fix the structure of the fabric.

The "tube" of the nonwoven material is separated from the conveyors by radially moving pushers 31, to which reciprocation is imparted by the cylindrical cam 32 rotating on the vertical shaft of the unit. At each revolution of the cam, the pushers remove the nonwoven material by separate sections throughout the perimeter of the delivery motion. Due to the great speed of the cam rotation and the small displacement of the pushers, the nonwoven material is separated from the conveyors by vibration, which provides for the continuous doffing of the nonwoven material from the delivery motion, without impairing its structure.

After the "tube" has been removed from the conveyors, it is cut along a spiral by the cutter 34 into a band 35 (FIG. 5) in which the fibers 2 are directed at a small angle to its axis; or the cutter $34^I$ cuts the "tube" along the generatix of the delivery motion into a web $35^I$ (FIG. 5) in which the fibers 2 are directed at a small angle in the sense perpendicular to the web axis.

When the nonwoven material is to be manufactured in the form of a band, the delivery means and the platform with the stitching arrangements are imparted with a slow synchronous rotation at a speed corresponding to that of the band coming out of the unit.

When the nonwoven material manufactured is in the form of a web, the delivery means and the platform do not rotate.

The finished band or web is forwarded to the point of storage or processing by means of the guide rollers 37 or conveyor $37^I$.

Thus, the proposed unit provides for the mechanized manufacturing of nonwoven material with directionally oriented fibers in the form of a continuous band or web and for preserving the unidirectional structure of the nonwoven material in the course of its manufacturing.

What is claimed is:

1. A unit for manufacturing fiber material comprising: a jet-nozzle furnace for producing fibers, means mounted beneath said furnace for applying a bonding agent to the fibers and for forming said fibers into a yarn; a carrying frame with a cylindrical support mounted thereon; a rotatable vertical shaft arranged inside said cylindrical support; a winding head with a yarn spreader mounted on said vertical shaft, a delivery means upon which the yarn is wound by the spreader, said delivery means being mounted on said cylindrical support under the winding head and including conveyors disposed around the vertical shaft and parallel thereto and means inside the delivery means for imparting vertical oscillations to said spreader to provide a sloping cross winding of the yarn onto the delivery means, a drying-and-heating chamber on said carrying frame around the delivery means, means for separating the fiber material from said conveyors and preserving the unidirectional structure thereof during continuous doffing of the material from the unit, the latter said means being located in the bottom part of the delivery means, a cutter for slitting the fiber material, said cutter being mounted on said carrying frame under the delivery means; and conveyors mounted on said carrying frame beneath the cutter for forwarding the material to a point of storage or processing.

2. A unit as claimed in claim 1 comprising means arranged around the upper part of the delivery means for stitching the fiber material with a synthetic yarn for additional reinforcement of the fiber material in a direction perpendicular to the orientation of the fibers.

3. A unit as claimed in claim 1 wherein said means for imparting vertical oscillations to the spreader comprises a single-face cam interacting with the spreader and coupled to the vertical shaft for rotation therewith, said cam having a profile and rotational speed for effecting the cross winding at a preset angle.

4. A unit as claimed in claim 1 wherein said means for separating the fiber material from said conveyors comprising a cylindrical cam mounted on said vertical shaft for rotation therewith and radially movable pushers engaging the fiber material and actuated by said cylindrical cam, said cutter being fixedly mounted on said carrying frame.

5. A unit for manufacturing fiber material comprising: a jet-nozzle furnace for producing fibers; means mounted beneath said furnace for applying a bonding agent to the fibers and for forming the fibers into a yarn; a carrying frame with a cylindrical support mounted thereon; a rotatable vertical shaft arranged inside said cylindrical support; a winding head with a yarn spreader mounted on said vertical shaft; a delivery means onto which the yarn is wound by the spreader, said delivery means including conveyors mounted around the vertical shaft and parallel thereto and installed under the winding head on said cylindrical support; means inside the delivery means for imparting vertical oscillations to the spreader to provide a sloping cross winding of the yarn on the delivery means, the latter means comprising a single-face cam interacting with the spreader and coupled to the vertical shaft for rotation therewith, said cam having a profile and rotational speed for effecting cross winding at a preset angle; means arranged around the upper part of the delivery means for stitching the fiber material with synthetic yarn to additionally reinforce the fiber material in the direction perpendicular to the orientation of the fibers; a drying-and-heating chamber mounted on said carrying frame around the delivery means, means for separating the fiber material from the conveyors and preserving the unidirectional structure of the fiber material during continuous doffing of the material from the delivery means, the latter said means being arranged at the bottom of said delivery means and including a cylindrical cam mounted on the rotatable shaft for rotation therewith and radially movable pushers engaging the fiber material and actuated by said cylindrical cam, a cutter fixed on the carrying frame under the delivery means for cutting the fiber material and conveyor means mounted on the carrying frame under the cutter for forwarding the cut fiber material to a point of storage or processing.

References Cited

UNITED STATES PATENTS

| | | | |
|---|---|---|---|
| 2,129,273 | 9/1938 | Hastmann et al. | 34—153 XR |
| 2,654,139 | 10/1953 | Long | 34—153 |
| 2,691,852 | 10/1954 | Slayter et al. | 156—167 X |
| 2,753,677 | 7/1956 | Slayter | 242—47.13 X |
| 2,951,003 | 8/1960 | Stephens | 161—143 |
| 3,046,180 | 7/1962 | Diehl et al. | 156—174 |

S. LEON BASHORE, Primary Examiner

ROBERT L. LINDSAY, Assistant Examiner

U.S. Cl. X.R.

34—153; 161—193; 156—172, 174; 242—47.13